United States Patent
Wareham

(10) Patent No.: US 8,123,428 B2
(45) Date of Patent: Feb. 28, 2012

(54) METHOD AND APPARATUS FOR LOCKING TELESCOPING MEMBERS

(75) Inventor: Robert C. Wareham, Midland, MI (US)

(73) Assignee: Cignys, Saginaw, MI (US)

( * ) Notice: Subject to any disclaimer, the term of this patent is extended or adjusted under 35 U.S.C. 154(b) by 394 days.

(21) Appl. No.: 12/407,412

(22) Filed: Mar. 19, 2009

(65) Prior Publication Data

US 2010/0239362 A1 Sep. 23, 2010

(51) Int. Cl.
*F16B 7/10* (2006.01)

(52) U.S. Cl. .......... 403/109.3; 403/109.2; 403/348; 403/379.1; 248/188.5

(58) Field of Classification Search .......... 403/109.3, 403/324, 325; 248/125.8, 188.5; 182/178.6, 182/182.3; 292/32, 33, 37, 42, 137, 163, 292/169
See application file for complete search history.

(56) References Cited

U.S. PATENT DOCUMENTS

| | | | | |
|---|---|---|---|---|
| 488,962 A | * | 12/1892 | Brintall | 292/33 |
| 942,490 A | * | 12/1909 | Dunn | 135/75 |
| 3,103,375 A | * | 9/1963 | McMullin | 403/300 |
| 3,214,187 A | * | 10/1965 | Fuerst | 280/654 |
| 3,474,833 A | * | 10/1969 | Garrette, Jr. et al. | 138/120 |
| 3,980,409 A | * | 9/1976 | Turner | 403/108 |
| 4,066,330 A | * | 1/1978 | Jones | 359/503 |
| 4,079,978 A | * | 3/1978 | McMullin | 294/19.1 |
| 4,342,207 A | * | 8/1982 | Holmes et al. | 70/119 |
| 4,385,849 A | * | 5/1983 | Crain | 403/109.3 |
| 5,352,057 A | | 10/1994 | Zody | |
| 5,520,360 A | * | 5/1996 | Wensman | 248/354.5 |
| 6,854,916 B2 | * | 2/2005 | Hsieh | 403/109.3 |
| 2002/0113176 A1 | * | 8/2002 | Frank | 248/125.8 |

FOREIGN PATENT DOCUMENTS

GB 2144482 A * 3/1985

* cited by examiner

*Primary Examiner* — Daniel Stodola
*Assistant Examiner* — Eric Chau
(74) *Attorney, Agent, or Firm* — Reising Ethington P.C.

(57) ABSTRACT

An apparatus for locking an inner telescoping member into a desired position within an outer telescoping member or sleeve. A locking mechanism is carried by the inner telescoping member and includes locking pins supported for motion between respective retracted positions and respective extended positions engaging detents in the outer telescoping member. A synchronizing ring is operatively connected to the locking pins such that synchronizing ring rotation moves the locking pins between the locking pins' respective retracted and extended positions.

13 Claims, 3 Drawing Sheets

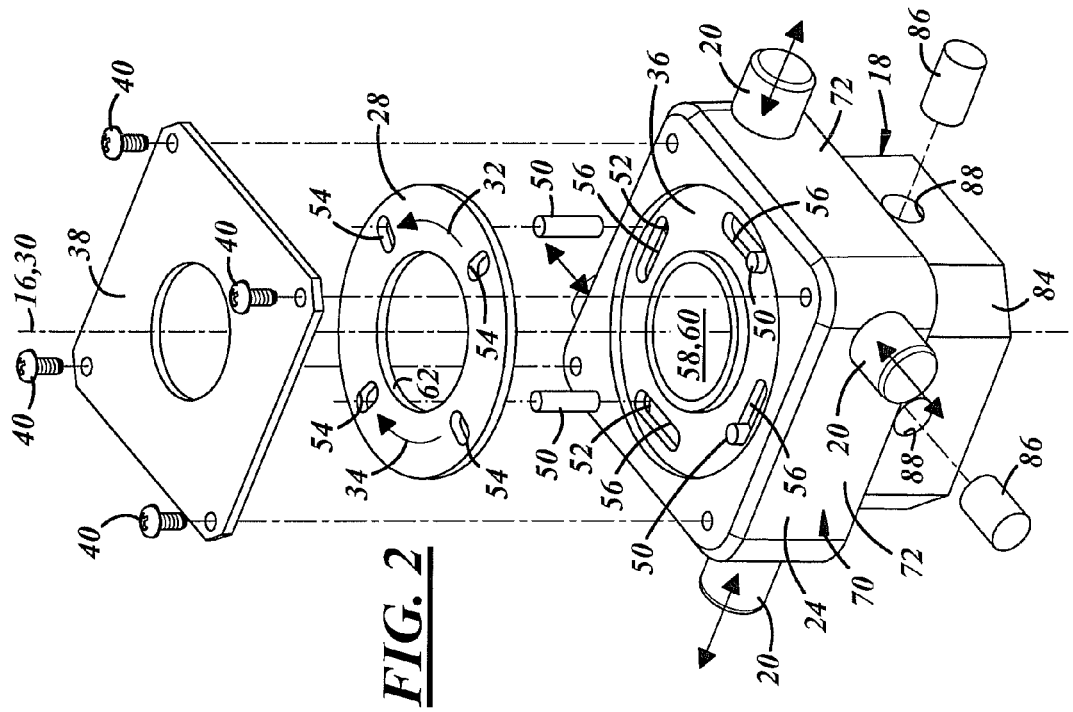

METHOD AND APPARATUS FOR LOCKING TELESCOPING MEMBERS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a method and apparatus for locking an inner telescoping member into a desired position within an outer telescoping member.

2. Description of the Related Art Including Information Disclosed Under 37 CFR 1.97 and 1.98

It is known for an inner telescoping member to be slidably received by an outer telescoping member and to be lockable into a desired position within the outer telescoping member. For example, U.S. Pat. No. 5,352,057 issued 4 Oct. 1994 to Zody, discloses an inner telescoping member slidably received within an outer telescoping member and lockable in a desired position within the outer telescoping member by a spring-biased pin that engages a detent in the outer telescoping member.

It is also known for safes and security doors to include locking pins driven by synchronizing rings. For example, U.S. Pat. No. 6,254,149 issued 1 Mar. 1994 to Shaeffer et al., discloses a locking mechanism that includes locking pins disposed in different generally coplanar positions, oriented in different directions, and movable between respective retracted disengaged positions, and extended engaged positions. A synchronizing ring is supported for rotation about a ring rotational axis, is connected to the locking pins, and is configured to drive the locking pins generally simultaneously between their respective retracted disengaged positions and extended engaged positions.

BRIEF SUMMARY OF THE DISCLOSURE

An apparatus is provided for locking an inner telescoping member into a desired position within an outer telescoping member. The apparatus includes an outer telescoping member and an inner telescoping member receivable within the outer telescoping member for relative motion along a longitudinally extending central apparatus axis. A locking mechanism may be carried by the inner telescoping member and may include a first locking pin supported for motion between a retracted position and an extended position in which the first locking pin engages a first detent in the outer telescoping member. A second locking pin may be supported for motion between a retracted position and an extended position in which the second locking pin engages a second detent in the outer telescoping member. A synchronizing ring may be supported for rotational motion about a ring rotational axis and may be operatively connected to the first and second locking pins such that synchronizing ring rotation in a disengagement direction moves the locking pins from the locking pins' respective extended positions toward their respective retracted positions. This allows both locking pins to be disengaged by moving just one of the locking pins toward its retracted position.

Alternatively, the locking mechanism may include a lock housing carried by the inner telescoping member and the synchronizing ring may be supported for rotational motion about the ring rotational axis on an annular ring track recess formed into the lock housing.

Alternatively the locking mechanism may include a ring cover plate that may be connected to the lock housing in a position that retains the synchronizing ring within the ring track recess.

Alternatively, the locking pins may be spring-biased toward their respective extended positions so that they will be driven into their respective extended positions when the inner telescoping member is moved to a position with the outer telescoping member where the locking pins are aligned with respective detents in the outer telescoping member.

Alternatively, the locking mechanism may include first and second compression springs that may be positioned to bias the respective first and second locking pins toward their respective extended positions.

Alternatively, the locking mechanism may include a third locking pin that may be connected to the synchronizing ring and movable between a retracted position and an extended position by synchronizing ring rotation. The extended positions of locking pins may be spaced angularly from one another about the central apparatus axis, such that an axial load transmitted from one telescoping member to the other through the locking pins may be shared by and distributed between the three locking pins when the three locking pins are concurrently engaged with respective detents in the outer telescoping member. This arrangement limits or precludes off-center loads from causing bending stresses in the locking pins that reduce their load capacity, and reduces the likelihood or eliminates the possibility of binding between the inner and outer telescoping members that might otherwise be caused by misalignment of the inner and outer telescoping members.

Alternatively, the locking mechanism may include a fourth locking pin that may be connected to the synchronizing ring and movable between a retracted position and an extended position by synchronizing ring rotation. The extended position of the fourth locking pin may be spaced angularly from the extended positions of the other locking pins relative to the central apparatus axis, such that an axial load transmitted from one telescoping member to the other through the locking pins may be shared by and distributed between the four locking pins when the four locking pins are concurrently engaged with respective detents in the outer telescoping member Alternatively, the locking pins may be oriented to move in respective directions between their retracted and extended positions that are different from one another.

Alternatively, the locking pins and their respective paths of motion between their respective retracted and extended positions may be generally coplanar to limit the axial extent of the space taken up by the locking mechanism.

Alternatively, the lock mechanism may include lost-motion connections between the synchronizing ring and the respective locking pins to allow linear translational motion of the locking pins to be converted into rotational motion of the synchronizing ring, and to allow rotational motion of the synchronizing ring to be converted into translational motion of the locking pins.

Alternatively, each lost-motion connection may include a guide pin carried by a locking pin and slidably received in a guide slot of the synchronizing ring.

Alternatively, the locking pins may be supported for axial reciprocal motion in respective positions offset from the ring rotational axis to leave a central axial region of the locking mechanism free of obstruction and to allow the lock housing to include a central axial cylindrically-shaped through-bore that allows for the passage of structures such as a jack screw shaft.

Alternatively, the outer telescoping member may comprise a rectangular tubular inner surface including four inner tubular facets. The lock housing may comprise a lock housing outer surface of a cross-sectional shape generally complementary to that of the rectangular tubular inner surface of the outer telescoping member and including four lock housing outer facets. When the inner telescoping member is moved to a desired lock position within the outer telescoping member, the four locking pins are spring biased into their respective extended positions protruding from the four lock housing outer facets and extending into the respective locking pin engagement holes when the inner telescoping member is disposed in a desired lock position within the outer telescoping member.

Alternatively, the inner telescoping member may comprise a lock mechanism receptacle defined by a rectangular tubular inner surface and the lock housing may comprise a rectangular prismatic axial projection of a cross-sectional shape generally complementary to that of the rectangular tubular inner surface of the inner telescoping member, the axial projection being receivable and retainable within the lock mechanism receptacle to connect the inner telescoping member to the lock mechanism.

Also, a method is provided for locking an inner telescoping member into a desired position within an outer telescoping member and then unlocking and releasing the inner telescoping member for movement relative to the outer telescoping member. According to this method a locking mechanism is provided on an inner telescoping member, the locking mechanism including at least two locking pins supported in a lock housing of the locking mechanism for motion between respective retracted and extended positions. The inner telescoping member is locked into a desired axial position with an outer telescoping member by moving the inner telescoping member within and along the outer telescoping member until the locking pins align with respective detents in the outer telescoping member and the locking pins are moved to their respective extended positions and into engagement with the respective detents in the outer telescoping member. The inner telescoping member is unlocked from the outer telescoping member by disengaging the locking pins from the respective detents by moving one of the locking pins toward its retracted position. The inner telescoping member may then be moved relative to the outer telescoping member until the locking pins are no longer aligned with the respective detents.

Alternatively, the step of providing a locking mechanism on an inner telescoping member may include supporting four locking pins in the lock housing for motion between respective retracted and extended positions.

Alternatively, the providing step may include biasing the locking pins toward their respective extended positions so that, when the inner telescoping member has reached the desired axial position within the outer telescoping member, the locking pins will move automatically to their respective extended positions and into engagement with the respective detents in the outer telescoping member.

Alternatively, the step of biasing the locking pins may include providing compression coil springs between an inner end of each locking pin and an inner end of respective locking pin receptacles formed in the lock housing.

Alternatively, the providing step may include providing a locking mechanism including a synchronizing ring supported for rotational motion about a ring rotational axis and connected to the locking pins, and the step of disengaging the locking pins may include moving the locking pins from the locking pins' respective retracted positions to their respective extended positions in response to synchronizing ring rotation in a disengagement direction caused by moving one of the locking pins toward its retracted position.

Alternatively, the providing step may include providing a locking mechanism including four locking pins supported in the lock housing for motion between respective retracted and extended positions, and the step of disengaging the locking pins may include moving the four locking pins from the locking pins' respective retracted positions to their respective extended positions in response to synchronizing ring rotation in a disengagement direction caused by moving one of the four locking pins toward its retracted position.

Alternatively, the providing step may include providing a locking mechanism that includes four locking pins supported in a lock housing for motion between respective retracted and extended positions.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 1 is a perspective view of an apparatus for locking telescoping members constructed according to the invention, with an outer telescoping member partially cut away to reveal an inner telescoping member and locking mechanism of the apparatus, and with the inner telescoping member partially cut away to reveal an interface between the locking mechanism and the inner telescoping member;

FIG. 2 is a partially exploded perspective view of the locking mechanism of the apparatus of FIG. 1;

DETAILED DESCRIPTION

Figure 5:
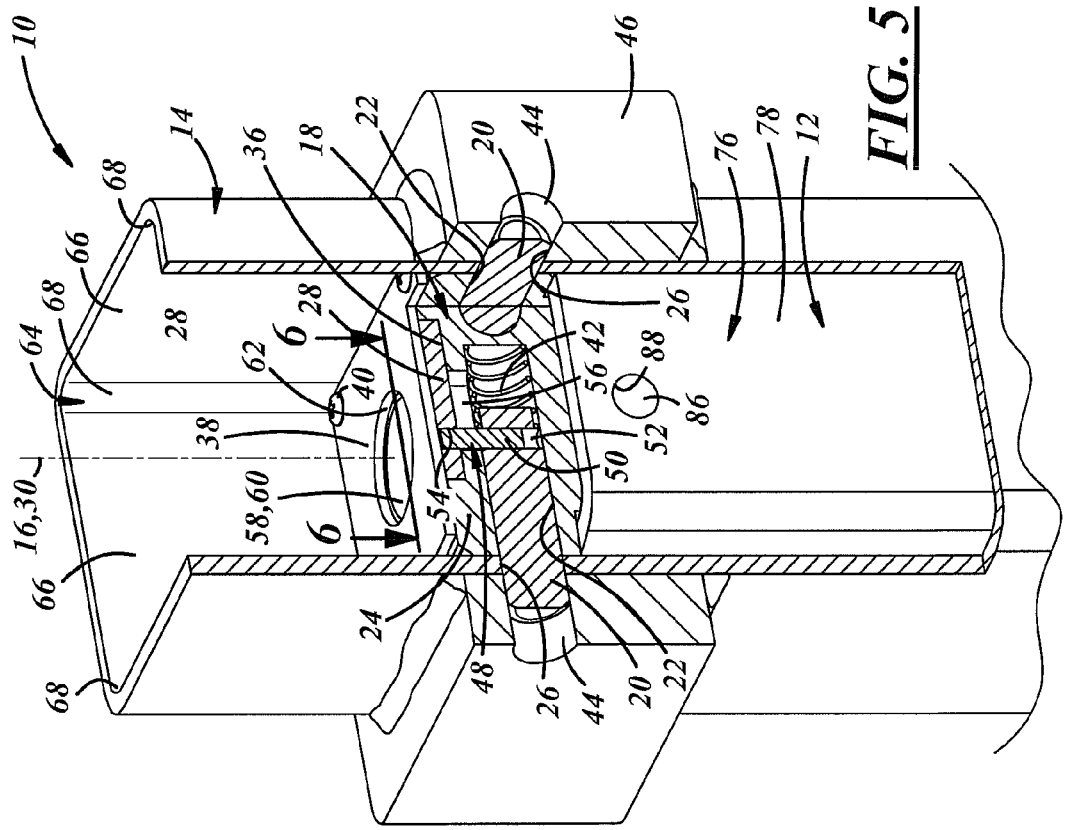
FIG. 5 is a perspective view of the apparatus of FIG. 1 with the inner telescoping member shown unlocked from the outer telescoping member and with locking pins of the locking mechanism shown in respective retracted positions.
Figure 3:
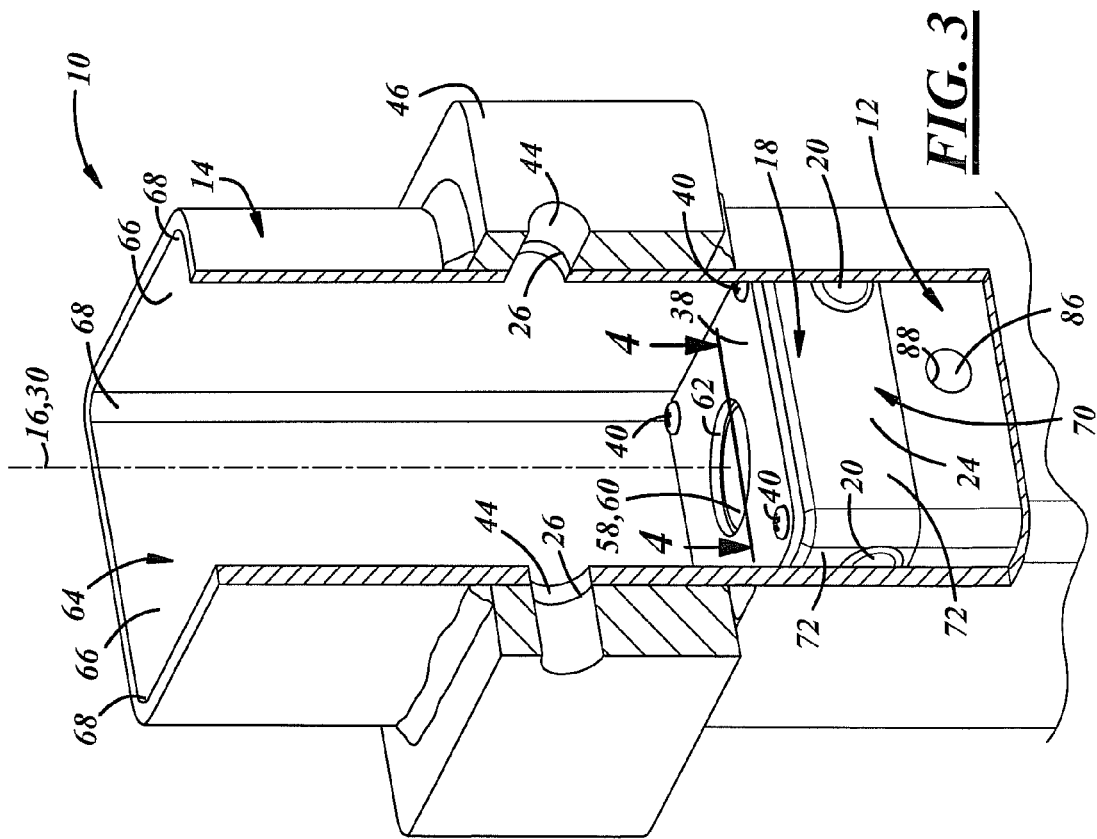
FIG. 3 is a perspective view of the apparatus of FIG. 1 with the inner telescoping member shown locked to the outer telescoping member by locking pins of the locking mechanism of the apparatus.
Figure 6:
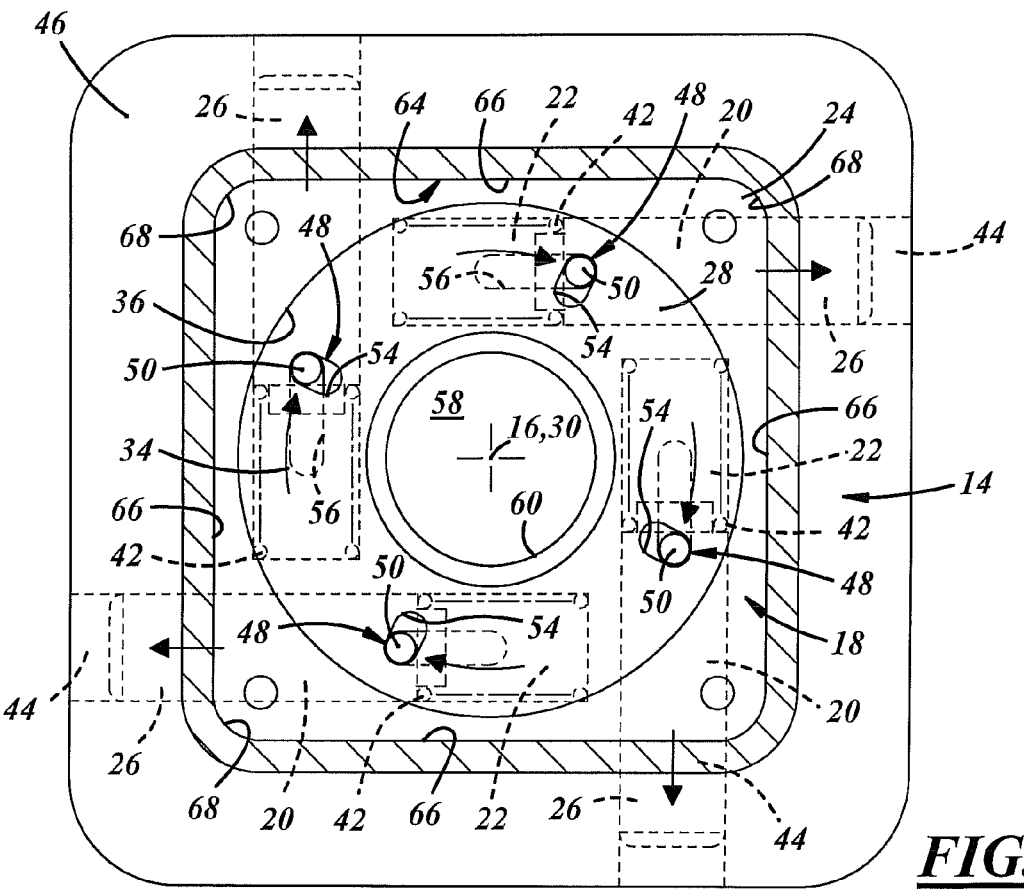
FIG. 6 is an end view of the apparatus arranged as shown in FIG. 5.

An apparatus 10 for locking an inner telescoping member into a desired position within an outer telescoping member is generally shown in FIGS. 1-6. The apparatus 10 may include an outer telescoping member 14 and an inner telescoping member 12 slidably receivable within the outer telescoping member 14 for relative motion along a longitudinally extending central apparatus axis 16. The apparatus 10 may also include a locking mechanism 18 carried by the inner telescoping member 12 and may include four generally cylindrical and axially elongated locking pins 20 supported in respective generally cylindrical locking pin receptacles 22 formed in a lock housing 24 of the locking mechanism 18 for axial motion between respective retracted or disengaged positions recessed within the lock housing 24 so as to allow the inner telescoping member 12 to move within and relative to the outer telescoping member 14, and respective extended or engaged positions protruding from the lock housing 24 and in which the locking pins 20 engage respective detents 26 in the outer telescoping member 14 so as to prevent the inner telescoping member 12 from being moved axially within and relative to the outer telescoping member 14. The locking pins 20 are shown in their respective extended positions in FIGS. 1, 2, 5, and 6; and in their respective retracted positions in FIGS. 3 and 4. In FIGS. 1, 5, and 6 the locking pins are shown engaging the detents 26 in the outer telescoping member 14. As best shown in FIGS. 1, 3, and 5, the lock housing 24 may be carried by and connected to the inner telescoping member 12.

Figure 4:
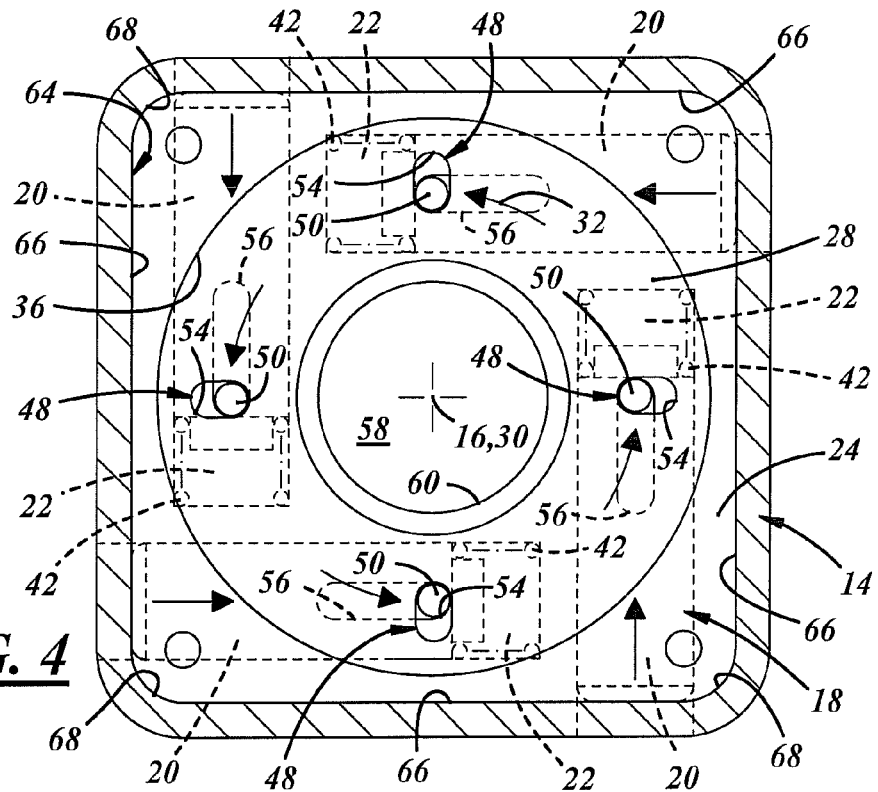
FIG. 4 is an end view of the apparatus arranged as shown in FIG. 3.

As best shown in FIGS. 2 and 4-6, the apparatus 10 may further include a synchronizing ring 28 that may be supported for rotational motion about a ring rotational axis 30, which may be coincident with the central apparatus axis 16. As best shown in FIG. 4, the synchronizing ring 28 may also be operatively connected to the locking pins 20 such that synchronizing ring 28 rotation in a disengagement direction 32 moves the locking pins 20 generally simultaneously from the locking pins' respective extended positions toward their respective retracted positions. This allows an operator to disengage all the locking pins 20 by depressing and disengaging a single locking pin 20. In other words, the synchronizing ring 28 may be connected to the locking pins 20 such that manual depression of any one of the locking pins 20 toward its retracted position causes the synchronizing ring 28 to rotate in the disengagement direction 32 and opposite an engagement direction 34, retracting the remaining lock pins 20 toward their respective retracted positions.

As best shown in FIG. 5, the synchronizing ring 28 may be supported for rotational motion about the ring rotational axis 30 on a complementary shaped annular ring track recess 36 formed into the lock housing 24. To reduce friction, the synchronizing ring 28 may comprise bearing bronze, i.e., a form of bronze having, e.g., a high lead content and known in the art to have anti-friction characteristics.

As shown in FIGS. 1, 2, 3, and 5, the locking mechanism 18 may also include a ring cover plate 38 that may be connected to the lock housing 24 in a position that retains the synchronizing ring 28 within the ring track recess 36. The ring cover plate 38 may be attached to the lock housing 24 by screws 40 or any other suitable means of attachment.

As best shown in FIG. 5, the locking pins 20 may be spring biased toward their respective extended positions so that the pins 20 will be automatically driven into their extended respective positions when the inner telescoping member 12 is moved to a position within the outer telescoping member 14 where the locking pins 20 are aligned with the respective detents 26 in the outer telescoping member 14. To bias the locking pins 20 toward their respective extended positions, the locking mechanism 18 may include four compression springs 42 positioned to bias the respective locking pins 20 toward their respective extended positions. The compression springs 42 may be housed between inner ends of each locking pin and an inner end of each locking pin receptacle 22.

The outer telescoping member 14 may include locking pin engagement holes 44 that include the respective detents 26 and that have diameters larger than those of the locking pins 20 so that locking pins 20 may be received into the locking pin engagement holes 44 when the inner telescoping member 12 is moved to a desired position within the outer telescoping member 14 where the locking pins 20 align with the holes 44 and move to their respective extended positions.

The outer telescoping member 14 may carry a generally square prismatic annular sleeve 46 to provide a larger bearing 28 area for large loads. The sleeve 46 may comprise metal and may be connected to the outer telescoping member 14 by any suitable means to include welding. The locking pin engagement holes 44 may extend through a wall of the outer telescoping member 14 and into and/or through the sleeve 46 so that axial loads borne by the outer telescoping member 14 in the vicinity of each locking pin engagement hole 44 will be shared and distributed by the sleeve 46.

The extended positions of the locking pins 20 may be generally co-planar with one another. The extended positions of the locking pins 20 may also be spaced angularly from one another relative to the central apparatus axis 16, or, as measured about the central apparatus axis 16, such that an axial load transmitted from one telescoping member to the other through the locking pins 20 is shared by and distributed between the four locking pins 20 when the four locking pins 20 are concurrently engaged with respective detents 26 in the outer telescoping member 14.

The locking pins 20 may be oriented to move in respective directions between their retracted and extended positions, which are generally co-planar with but different from one another. More specifically, the directions of motion of the four locking pins 20 may be angularly spaced about the central apparatus axis 16 and the ring rotational axis 30 by approximate 90 degree increments. The locking pins 20, and their respective paths of motion between their respective retracted and extended positions, are generally co-planar so as, among other reasons, to limit the axial extent of the space taken up by the locking mechanism 18.

The lock mechanism 18 may include lost motion connections, generally indicated at 48 in FIGS. 4-6, between the synchronizing ring 28 and its respective locking pins 20 to allow linear translational motion of the locking pins 20 to be converted into rotational motion of the synchronizing ring 28, and to allow rotational motion of the synchronizing ring 28 to be converted into linear translational motion of the locking pins 20. Each lost motion connection 48 may include a guide pin 50 having a first end carried and rigidly received by a diametrically extending guide pin receptacle 52 in a locking pin 20 and a second end slidably received in a radially oriented guide slot 54 of the synchronized ring 28. The guide slots 54 may be arranged at approximate 90 degree angular intervals about the ring rotational axis 30. As best shown in FIGS. 2 and 4, the lock housing 24 includes guide pin slots 56 oriented to accommodate the reciprocal motions of the guide pins 50.

The locking pins 20 may be supported for axial reciprocal motion in respective generally co-planar positions offset from the ring rotational axis 30 as well as the central apparatus axis 16, to leave a central axial region 58 of the locking mechanism 18 free of obstruction and to allow the lock housing 24 to include a central axial cylindrically shaped through bore 60 that allows for the passage of structures such as a jack screw shaft. The ring cover plate 38 may include a through hole 62 that may be generally co-extensive with the lock housing through bore 60 so that a jack screw shaft or other such structure may pass through the ring cover plate 38 as well.

The outer telescoping member 14 may comprise a generally square tubular inner surface 64 including four inner facets 66 and four rounded or chamfered corners 68 joining the inner facets 66. The lock housing 24 may comprise a lock housing outer surface 70 of across sectional shape generally complementary to that of the square tubular inner surface 64 of the outer telescoping member 14 and including four lock housing outer facets 72, which are disposed generally parallel to and adjacent the respective inner facets 66 of the square tubular inner surface 64 of the outer telescoping member 14 when the lock housing 24 and inner telescoping member 12 are received in the outer telescoping member 14. When the inner telescoping member 12 is moved to a desired lock position within the outer telescoping member 14 as shown in FIGS. 1, 5, and 6, the four locking pins 20 are spring biased into their respective extended positions protruding from the four lock housing 24 outer facets and extending into their respective locking pin engagement holes 44 that pass through the outer telescoping member 14 and the sleeve 46.

As shown in FIG. 5, the inner telescoping member 12 may comprise a lock mechanism receptacle 76 defined by a generally square tubular receptacle inner surface 78 having rounded or chamfered corners 80 joining four facets 82 of the receptacle inner surface 78. The lock housing 24 may comprise a rectangular or square prismatic or axial projection 84 of a cross-sectional shape generally complementary to that of the generally square tubular receptacle inner surface 78 of the inner telescoping member 12. The axial projection 84 may be receivable into the lock mechanism receptacle 76 to connect the inner telescoping member 12 to the lock mechanism 18. The axial projection 84 of the lock mechanism 18 may be retained within the lock mechanism receptacle 76 of the inner telescoping member 12 by any suitable means to include the use of four dowel pins 86 received in dowel pin holes 88 that extend through the inner telescoping member 12 and into the axial projection 84 of the lock mechanism 18.

In practice, the inner telescoping member 12 may be locked into a desired position within the outer telescoping member 14 by moving the inner telescoping member 12 within and along the outer telescoping member 14 until the locking pins 20 align with respective detents 26 in the outer telescoping member 14 and the locking pins 20 generally simultaneously move to their respective extended positions and into engagement with the respective detents 26 in the outer telescoping member 14. Where the locking pins 20 are biased toward their respective extended positions as shown in FIG. 5, once the inner telescoping member 12 has reached the desired axial position within the outer telescoping member 14, the locking pins 20 will move automatically to their respective extended positions and into engagement with their respective detents 26 in the outer telescoping member 14 as shown in FIGS. 1, 5, and 6. The inner telescoping member 12 may be unlocked and freed from movement within the outer telescoping member 14 by disengaging the locking pins 20 from their respective detents 26 in the outer telescoping member 14 by moving one of the locking pins 20 towards its retracted position. The locking pins 20 are moved from their respective retracted positions to their respective extended positions in response to synchronizing ring 28 rotation in the disengagement direction 32 as caused by movement of the one locking pin toward its retracted position.

This description, rather than describing limitations of an invention, illustrates only an embodiment of the invention recited in the claims. The language of this description is therefore purely descriptive and is non-limiting. Obviously, it's possible to modify this invention from what the description teaches. Within the scope of the claims, one may practice the invention as described.

What is claimed is:

1. An apparatus for locking an inner telescoping member into a desired position within an outer telescoping member, the apparatus comprising:
    an outer tubular telescoping member comprising first and second locking pin engagement holes;
    an inner tubular telescoping member receivable within the outer telescoping member for relative motion along a longitudinally extending central apparatus axis; and
    a locking mechanism carried by the inner telescoping member and including:
        a lock housing carried by the inner telescoping member and configured to be receivable within the outer telescoping member for relative motion along the central apparatus axis with the inner telescoping member,
        a first locking pin carried by the lock housing in a position alignable with the first locking pin engagement hole in the outer telescoping member and supported for motion between a retracted position within the housing and an extended position in which the first locking pin protrudes outwardly from the housing and engages the first locking pin engagement hole in the outer telescoping member,
        a first biasing member carried by the housing and positioned to resiliently bias the first locking pin toward its extended position,
        a second locking pin carried by the lock housing in a position alignable with the second locking pin engagement hole in the outer telescoping member and supported for motion between a retracted position within the housing and an extended position in which the second locking pin protrudes outwardly from the housing and engages the second locking pin engagement hole in the outer telescoping member,
        a second biasing member carried by the housing and positioned to resiliently bias the second locking pin toward its extended position, and
        a synchronizing ring carried by the housing and supported for rotational motion about a ring rotational axis and operatively connected to the first and second locking pins wherein depression of one of the locking pins rotates the synchronizing ring in a disengagement direction thus withdrawing the other locking pin toward its retracted position.

2. An apparatus as defined in claim 1 in which the synchronizing ring is supported for rotational motion about the ring rotational axis on an annular ring track recess formed into the lock housing.

3. An apparatus as defined in claim 2 in which the locking mechanism includes a ring cover plate that is connected to the lock housing in a position that retains the synchronizing ring within the ring track recess.

4. An apparatus as defined in claim 1 in which the locking mechanism includes first and second compression springs positioned to bias the respective first and second locking pins toward their respective extended positions.

5. An apparatus as defined in claim 1 in which:
    the locking mechanism includes a third locking pin that is connected to the synchronizing ring and movable between a retracted position and an extended position by synchronizing ring rotation; and
    the extended positions of locking pins are spaced angularly from one another about the central apparatus axis such that an axial load transmitted from one telescoping member to the other through the locking pins is shared by and distributed between the three locking pins when the three locking pins are concurrently engaged with respective detents in the outer telescoping member.

6. An apparatus as defined in claim 5 in which:
    the locking mechanism includes a fourth locking pin that is connected to the synchronizing ring and movable between a retracted position and an extended position by synchronizing ring rotation; and
    the extended position of the fourth locking pin is spaced angularly from the extended positions of the other locking pins relative to the central apparatus axis such that an axial load transmitted from one telescoping member to the other through the locking pins is shared by and distributed between the four locking pins when the four locking pins are concurrently engaged with respective detents in the outer telescoping member.

7. An apparatus as defined in claim 6 in which:

the outer telescoping member comprises a rectangular tubular inner surface including four inner tubular facets, and further comprises four locking pin engagement holes that are disposed in the respective four facets, respectively;

the lock housing comprises a lock housing outer surface of a cross-sectional shape generally complementary to that of the rectangular tubular inner surface of the outer telescoping member and including four lock housing outer facets, which are disposed generally parallel to and adjacent the respective inner facets of the square tubular inner surface of the outer telescoping member when the lock housing and inner telescoping member are received in the outer telescoping member; and the four locking pins are spring biased into their respective extended positions protruding from the four lock housing outer facets and extending into the respective locking pin engagement holes when the inner telescoping member is disposed in a desired lock position within the outer telescoping member.

8. An apparatus as defined in claim 7 in which:

the inner telescoping member comprises a lock mechanism receptacle defined by a rectangular tubular inner surface;

the lock housing comprises a rectangular prismatic axial projection of a cross-sectional shape generally complementary to that of the rectangular tubular inner surface of the inner telescoping member; and the axial projection is receivable and retainable within the lock mechanism receptacle.

9. An apparatus as defined in claim 1 in which the locking pins are oriented to move in respective directions between their retracted and extended positions that are different from one another.

10. An apparatus as defined in claim 1 in which the locking pins and their respective paths of motion between their respective retracted and extended positions are generally coplanar.

11. An apparatus as defined in claim 1 in which the lock mechanism includes lost-motion connections between the synchronizing ring and the respective locking pins.

12. An apparatus as defined in claim 1 in which each lost-motion connection includes a guide pin carried by a locking pin and slidably received in a guide slot of the synchronizing ring.

13. An apparatus as defined in claim 1 in which the locking pins are supported for axial reciprocal motion in respective positions offset from the ring rotational axis.

* * * * *